United States Patent
Li et al.

(10) Patent No.: US 10,712,642 B2
(45) Date of Patent: Jul. 14, 2020

(54) OPTICAL PROJECTION MODULE WITH IMPROVED HEAT DISSIPATION

(71) Applicant: TRIPLE WIN TECHNOLOGY (SHENZHEN) CO. LTD., Shenzhen (CN)

(72) Inventors: Shuai-Peng Li, Shenzhen (CN); Jing-Wei Li, Guangdong (CN); Shin-Wen Chen, New Taipei (TW); Sheng-Jie Ding, Guangdong (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 36 days.

(21) Appl. No.: 16/182,565

(22) Filed: Nov. 6, 2018

(65) Prior Publication Data

US 2020/0089090 A1    Mar. 19, 2020

(30) Foreign Application Priority Data

Sep. 13, 2018  (CN) .......................... 2018 1 1068706

(51) Int. Cl.
*G03B 21/16*   (2006.01)
*G03B 21/20*   (2006.01)

(52) U.S. Cl.
CPC .......... *G03B 21/16* (2013.01); *G03B 21/2033* (2013.01)

(58) Field of Classification Search
CPC ....... G03B 21/16; G03B 21/2033; G02F 1/29; G02F 2001/294; H04N 5/2254; H04N 9/3144; H05K 1/0274
See application file for complete search history.

(56) References Cited

U.S. PATENT DOCUMENTS

| | | | | |
|---|---|---|---|---|
| 7,854,517 B2* | 12/2010 | Tsubura | ................ | G03B 21/16 353/52 |
| 9,235,017 B1* | 1/2016 | Meadowcroft | ...... | G02B 6/4269 |
| 2007/0146649 A1* | 6/2007 | Daniel | ................ | G03B 21/001 353/99 |
| 2008/0212285 A1* | 9/2008 | Sun | ......................... | G06F 1/181 361/710 |
| 2009/0002642 A1* | 1/2009 | Chang | ................ | H04N 9/3144 353/52 |
| 2011/0019161 A1* | 1/2011 | Chen | ...................... | G03B 21/16 353/61 |
| 2015/0276200 A1* | 10/2015 | Huang | ................ | F21V 23/009 362/608 |
| 2020/0014893 A1* | 1/2020 | Li | ........................ | H04N 9/3144 |

FOREIGN PATENT DOCUMENTS

TW         M309521         4/2007

* cited by examiner

*Primary Examiner* — Isiaka O Akanbi
*Assistant Examiner* — Danell L Owens
(74) *Attorney, Agent, or Firm* — ScienBiziP, P.C.

(57) ABSTRACT

An optical projection module with improved heat dissipation includes a circuit board having a first surface and a second surface opposite the first surface. A semiconductor substrate is mounted on the first surface. The semiconductor substrate has a third surface facing the first surface and a fourth surface opposite to the third surface. A light source and an optical member are mounted on the fourth surface. The optical member includes a lens holder. The lens holder defines a receiving space for receiving the light source. The lens holder further defines at least one escaping hole. A heat dissipation block is received in each escaping hole.

11 Claims, 5 Drawing Sheets

OPTICAL PROJECTION MODULE WITH IMPROVED HEAT DISSIPATION

FIELD

The subject matter herein generally relates to optical projectors.

BACKGROUND

An optical projection module may include a printed circuit board and a light source mounted on the printed circuit board. The light source can generate great heat that can be difficult to dissipate. The heat can cause distortion of the components.

Therefore, there is room for improvement in the art.

BRIEF DESCRIPTION OF THE DRAWINGS

Implementations of the present disclosure will now be described, by way of embodiments, with reference to the attached figures.

DETAILED DESCRIPTION

Figure 1:
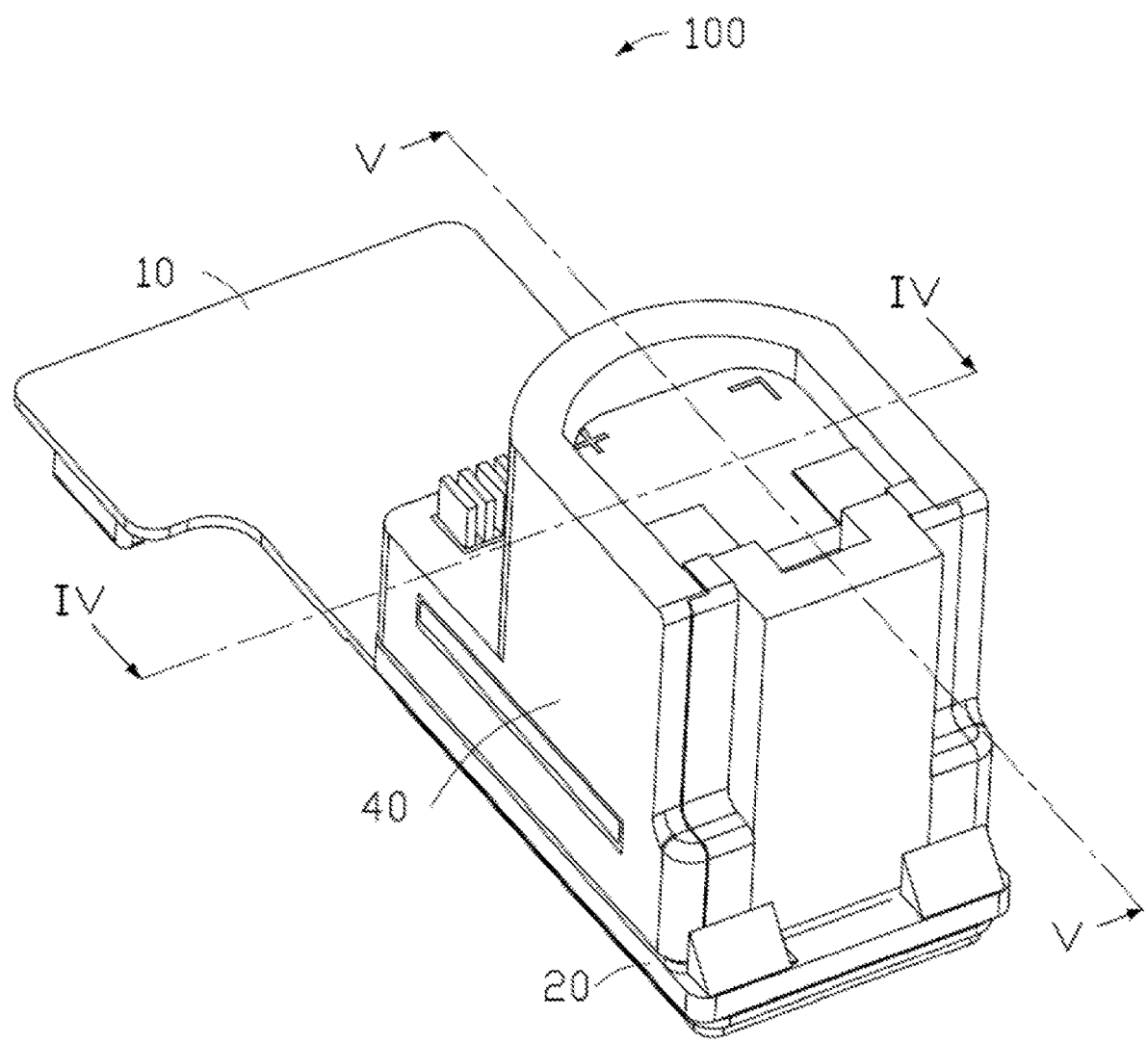
FIG. 1 is an isometric view of an embodiment of an optical projection module according to the present disclosure.

It will be appreciated that for simplicity and clarity of illustration, where appropriate, reference numerals have been repeated among the different figures to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 2:
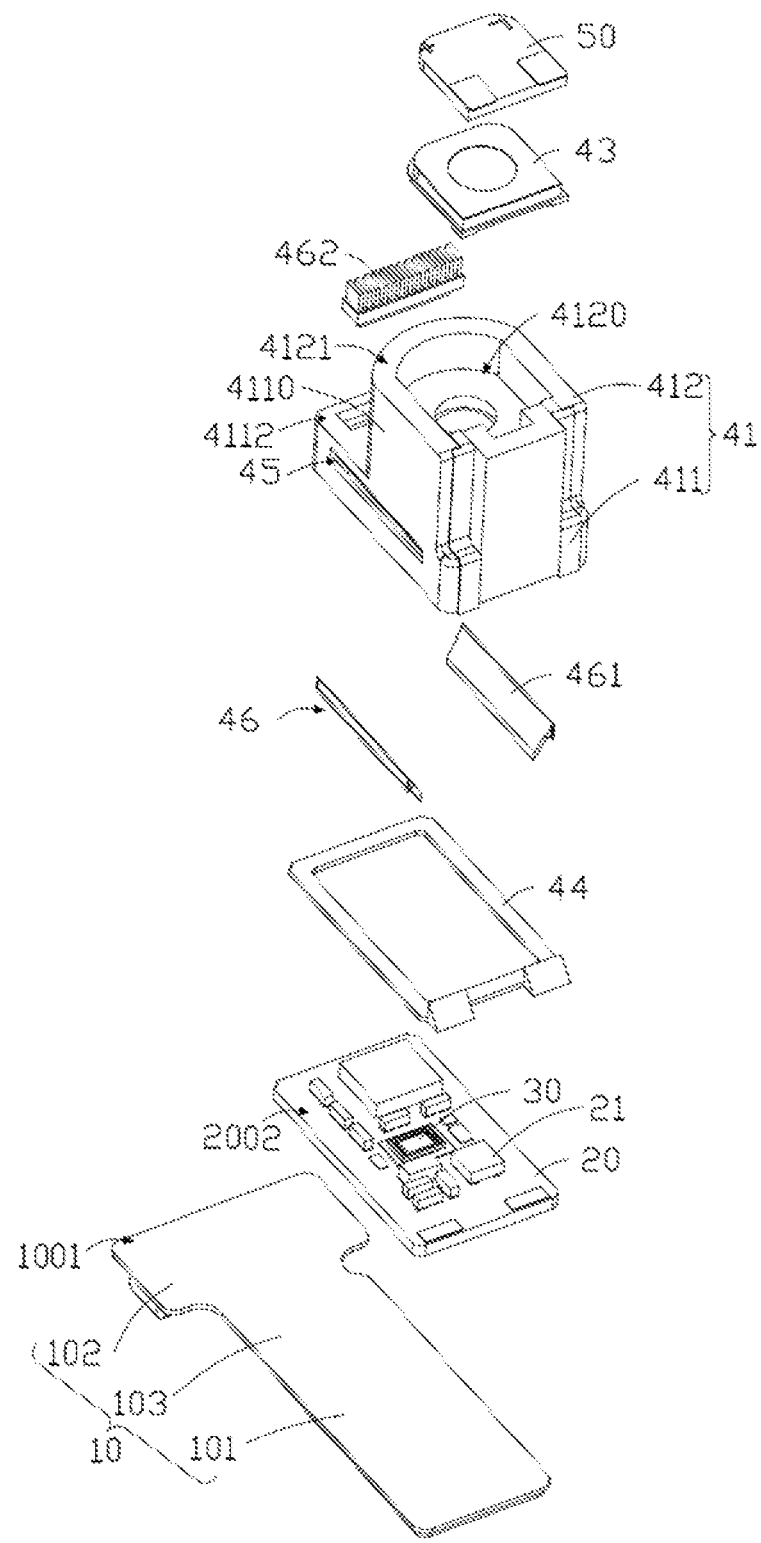
FIG. 2 is an exploded isometric view of the optical projection module of FIG. 1.
Figure 3:
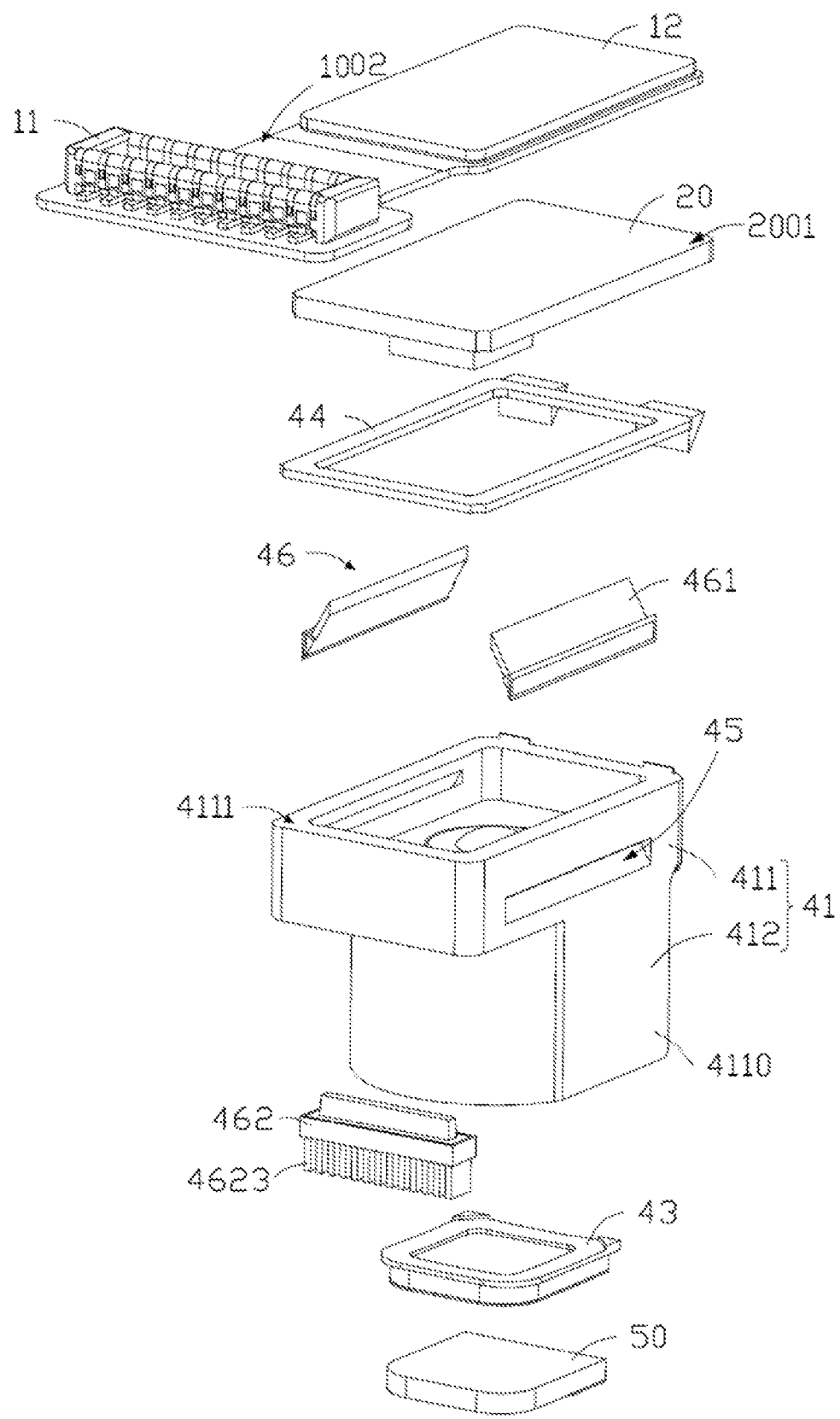
FIG. 3 is similar to FIG. 2, but showing the optical projection module from another angle.
Figure 4:
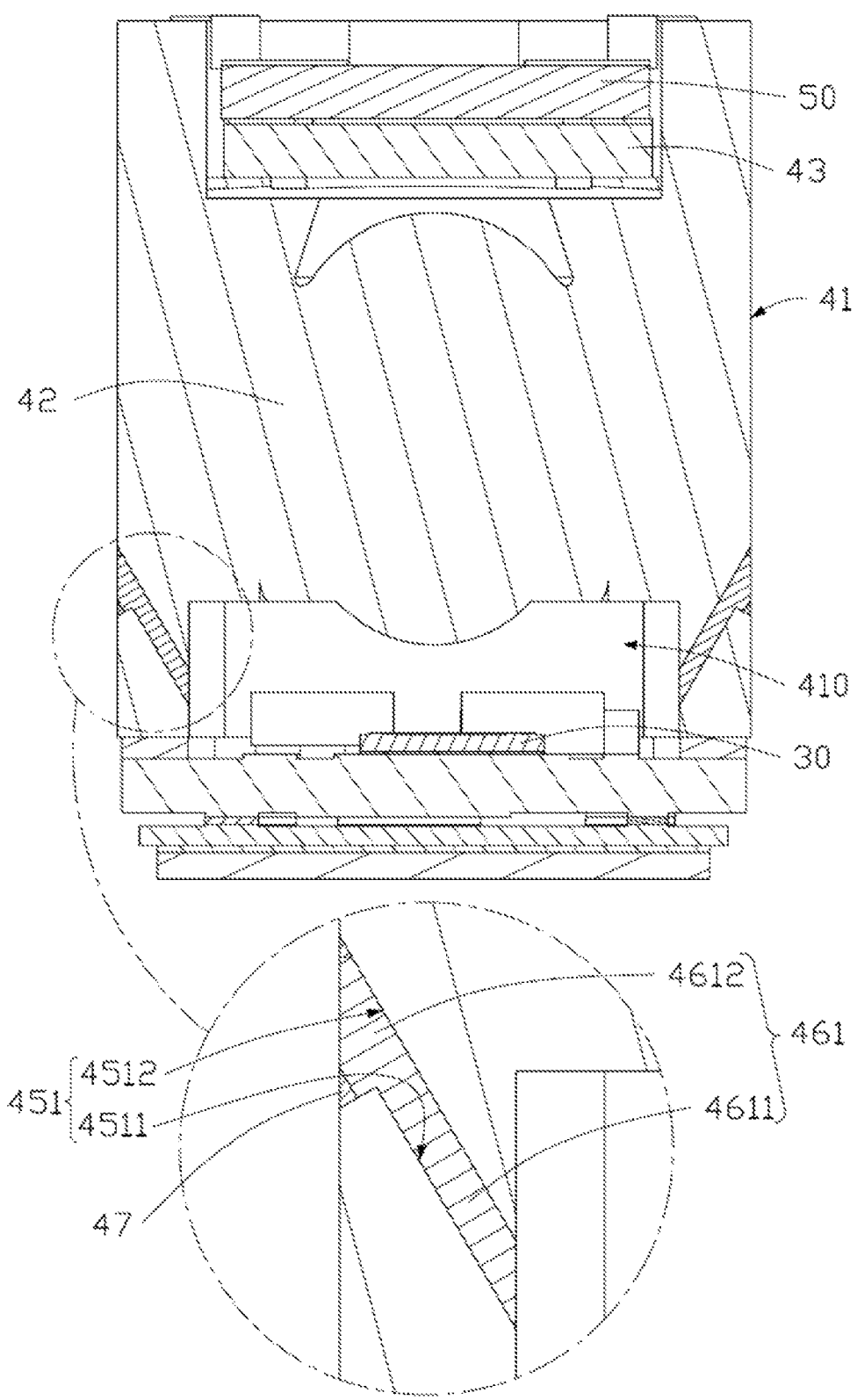
FIG. 4 is a cross-sectional view taken along line IV-IV of FIG. 1.
Figure 5:
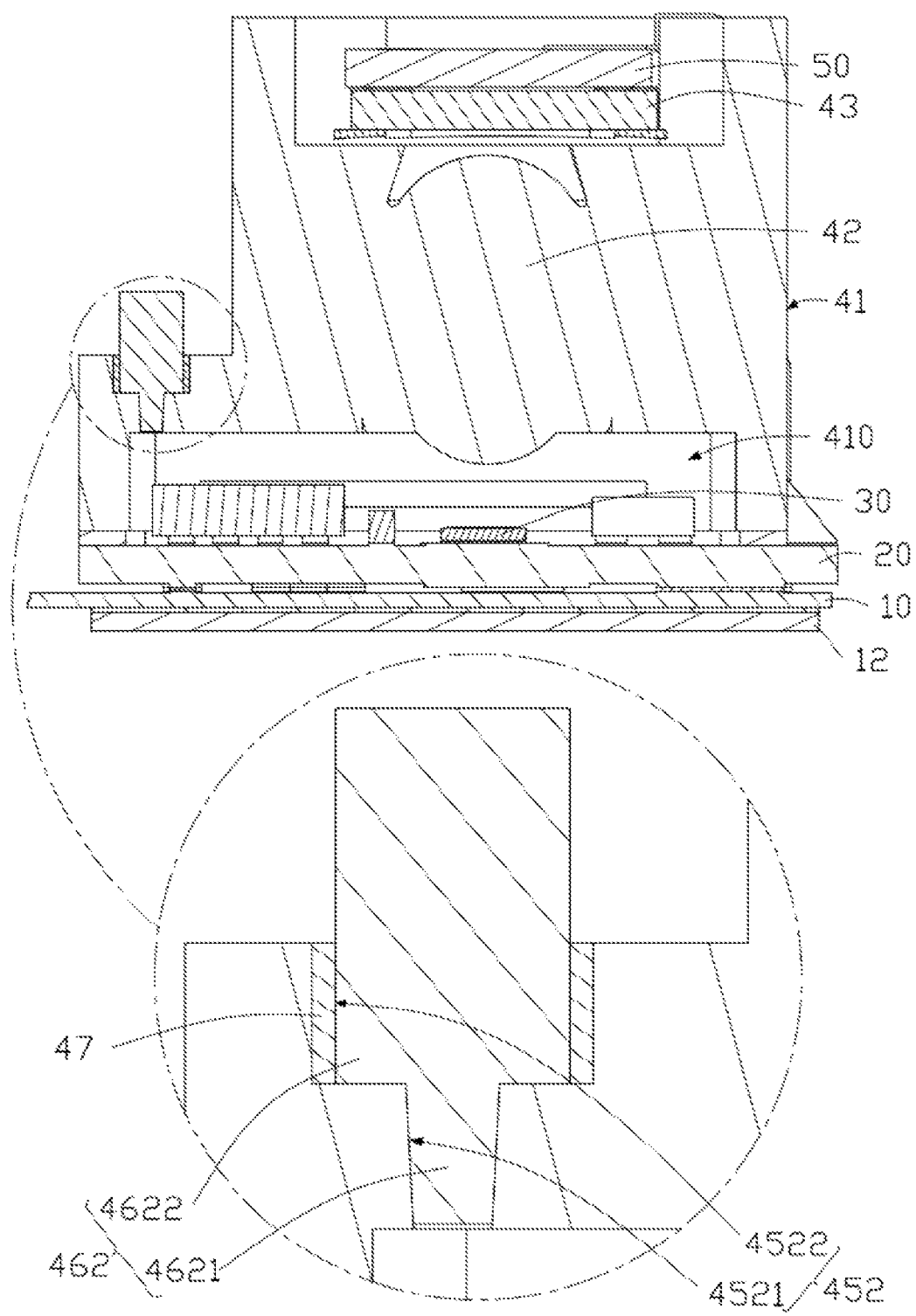
FIG. 5 is a cross-sectional view taken along line V-V of FIG. 1.

FIGS. 1 to 5 illustrate a first embodiment of an optical projection module 100. The optical projection module 100 includes a circuit board 10 having a first surface 1001 and a second surface 1002, opposite to the first surface 1001. A semiconductor substrate 20 is mounted on the first surface 1001 of the circuit board 10. The semiconductor substrate 20 has a third surface 2001 facing the first surface 1001 and a fourth surface 2002 opposite to the third surface 2001. A light source 30 and an optical member 40 are mounted on the fourth surface 2002 of the semiconductor substrate 20, so that the light emitted from the light source 30 is directed away from the circuit board 10.

The circuit board 10 can be a flexible circuit board, a rigid circuit board, or a rigid-flexible circuit board. In an embodiment, the circuit board 10 is a rigid-flexible circuit board including a first rigid board portion 101, a second rigid board portion 102, and a flexible board portion 103 connected between the first rigid board portion 101 and the second rigid board portion 102. The second rigid board portion 102 has an electronic connecting component 11. The electronic connecting component 11 can be a connector or gold fingers (edge connectors). The optical projection module 100 can be mounted to other electronic devices through the electronic connecting component 11. A reinforcing plate 12 is glued to the second surface 1002 of the circuit board 10. In one embodiment, the reinforcing plate 12 is glued to the first rigid board portion 101. The reinforcing plate 12 can be made of metal, such as stainless steel. The electronic connecting component 11 and the reinforcing plate 12 can both be positioned on the second surface 1002 of the circuit board 10.

The semiconductor substrate 20 is connected to the first surface 1001 of the circuit board 10. In one embodiment, the semiconductor substrate 20 is connected to the first rigid board portion 101 of the first surface 1001. In an embodiment, the semiconductor substrate 20 can be made of ceramic material.

The light source 30 is connected to a center of the fourth surface 2002 of the semiconductor substrate 20. The light source 20 can emit light. The light source 30 can be one of vertical cavity surface emitting laser (VCSEL), light emitting diode (LED), infra-red (IR) LED, and organic LED (OLED). In an embodiment, the light source 30 is a VCSEL that emits light with wave lengths between 830 nm or 950 nm, both inclusive. The semiconductor substrate 20 can further include a plurality of electronic components 21 surrounding the light source 30. The electronic components 21 can be resistors, capacitors, diodes, triodes, relays, or electrically erasable programmable read only memories (EEPROMs).

The optical member 40 includes a lens holder 41, a collimation lens 42, a first diffraction optical element (DOE) 43, and a second DOE 50. The collimation lens 42, the first DOE 43, and the second DOE 50 are mounted in the lens holder 41.

The lens holder 41 is glued to the fourth surface 2002 of the semiconductor substrate 20 by an adhesive layer 44. The lens holder 41 defines a receiving space 410 for receiving the light source 30 and the electronic components 21.

In an embodiment, the lens holder 41 includes a hollow and substantially square first holding portion 411 and a hollow and substantially circular second holding portion 412. The first holding portion 411 is glued to the second surface 2002 of the semiconductor substrate 20. The first holding portion 411 has a fifth surface 4111 facing the fourth surface 2002 and a six surface 4112 opposite to the fifth surface 4111. The second holding portion 412 is connected to the six surface 4112 of the first holding portion 411. A width of the first holding portion 411 is greater than a width of the second holding portion 412. The receiving space 410 is in the first holding portion 411. The collimation lens 42 is between the first holding portion 411 and the second holding portion 412, and closes off an end of the receiving space 410 opposite from the semiconductor substrate 20. The collimation lens 42 collimates the light from the light source 30. The collimation lens 42 can be integrally formed with the lens holder 41. The second holding portion 412 has a seventh surface 4121 facing away from the sixth surface 4112. The seventh surface 4121 of the second holding portion 412 has a recess 4120. The first DOE 43 and the second DOE 50 are received in the recess 4120. The first DOR 43 is positioned between the collimation lens 42 and the second DOE 50. The first DOE 43 and the second DOE 50 can diffract the light from the collimation lens 42.

The first holding portion 411 includes a plurality of sidewalls 4110 surrounding the receiving space 410. At least one escaping hole 45 is defined at the sidewalls 4110. A heat dissipation block 46 is received in each escaping hole 45. The heat dissipation block 46 can be fixed in the escaping hole 45 by the adhesive 47. The heat dissipation block 46 can be made of metal or other materials having good heat dissipation efficiency.

In an embodiment, the at least one escaping hole 45 includes a first type of escaping hole 451, a second type of escaping hole 452, and a combination thereof. The heat dissipation block 46 includes a first type of heat dissipation block 461, a second type of heat dissipation block 462, and a combination thereof. The first type of heat dissipation block 461 is received in the first type of escaping hole 451. The second type of heat dissipation block 462 is received in the second type of escaping hole 452.

The first type of escaping hole 451 is defined at the sidewall 4110 along a direction that is inclined with respect to the sidewall 4110 so that the first type of heat dissipation block 461 has a large heat dissipation area. The first type of escaping hole 451 includes a first hole portion 4511 and a second hole portion 4512 connected to the first hole portion 4511. The first hole portion 4511 is positioned adjacent to an inner side of the sidewall 4110. The second hole portion 4512 is positioned adjacent to an outer side of the sidewall 4110. The first type of heat dissipation block 461 includes a first heat dissipation portion 4611 received in the first hole portion 4511 and a second heat dissipation portion 4612 received in the second hole portion 4512. A width of the second hole portion 4512 is greater than a width of the second heat dissipation portion 4612 so that there is a first gap between the second hole portion 4512 and the second heat dissipation portion 4612. The first gap can receive the adhesive 47.

The second type of escaping hole 452 is defined at the sidewall 4110 along a direction parallel to the sidewall 4110 and perpendicular to the semiconductor substrate 20. The second type of escaping hole 452 includes a third hole portion 4521 and a fourth hole portion 4522 connected to the third hole portion 4521. The third hole portion 4521 is positioned adjacent to the semiconductor substrate 20. The fourth hole portion 4522 is positioned away from the semiconductor substrate 20. The second type of heat dissipation block 462 includes a third heat dissipation portion 4621 received in the third hole portion 4521 and a fourth heat dissipation portion 4622 received in the fourth hole portion 4522. The fourth heat dissipation portion 4622 includes at least two fins 4623 parallel to each other. The fins 4623 protrude from the first holding portion 411 to increase the heat dissipation area. There is a second gap between the fourth heat dissipation portion 4622 and the fourth hole portion 4522. The second gap can receive the adhesive 47.

When the optical projection module 100 is in operation, the heat generated by the light source 30 is delivered to the outside environment through the heat dissipation block 46. Thus, there is less heat buildup in the immediate area of the optical projection module 100, preventing the temperature of the optical projection module 100 from a level so high that causes distortions to light beams. By not causing, or substantially reducing, distortions of the light beams emitted by the light source 30, the projective quality of the optical projection module 100 are improved.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. An optical projection module comprising:
a circuit board having a first surface and a second surface opposite the first surface;
a semiconductor substrate mounted on the first surface of the circuit board, the semiconductor substrate comprising a third surface facing the first surface and a fourth surface opposite to the third surface;
a light source mounted on the fourth surface of the semiconductor substrate;
an optical member mounted on the fourth surface of the semiconductor substrate, the optical member comprising a lens holder, at least one escaping hole, and a heat dissipation block received in each of the escaping hole, the lens holder further comprising a receiving space wherein the light source is received in the receiving space.

2. The optical projection module of claim 1, wherein the heat dissipation block is made of metal, and is fixed in each of the escaping hole by adhesive.

3. The optical projection module of claim 2, wherein the lens holder further comprises a first holding portion and a second holding portion, the first holding portion is connected to the second surface of the semiconductor substrate, the first holding portion comprises a fifth surface facing the fourth surface and a six surface opposite to the fifth surface, the second holding portion is connected to the six surface of the first holding portion, a width of the first holding portion is greater than a width of the second holding portion, the receiving space is in the first holding portion, the first holding portion comprises a plurality of sidewalls surrounding the receiving space, one of the escaping hole is defined at each one of the plurality of sidewalls.

4. The optical projection module of claim 3, wherein the at least one escaping hole comprises a first type of escaping hole, the heat dissipation block comprises a first type of heat dissipation block received in the first type of escaping hole, the first type of escaping hole is at the sidewall along a direction which is inclined with respect to the sidewall, the first type of escaping hole comprises a first hole portion and a second hole portion connected to the first hole portion, the first hole portion is adjacent to an inner side of the sidewall, the second hole portion is adjacent to an outer side of the sidewall, the first type of heat dissipation block comprises a first heat dissipation portion received in the first hole portion and a second heat dissipation portion received in the second hole portion, a width of the second hole portion is greater than a width of the second heat dissipation portion, a first gap is between the second hole portion and the second heat dissipation portion, and the adhesive is received in the first gap.

5. The optical projection module of claim 4, wherein the at least one escaping hole further comprises a second type of escaping hole, the heat dissipation block further comprises a second type of heat dissipation block received in the second type of escaping hole, the second type of escaping hole is at the sidewall along a direction parallel to the sidewall and perpendicular to the semiconductor substrate, the second type of escaping hole comprises a third hole portion and a fourth hole portion connected to the third hole portion, the third hole portion is adjacent to the semiconductor substrate, the fourth hole portion is away from the semiconductor substrate, the second type of heat dissipation block comprises a third heat dissipation portion received in the third hole portion and a fourth heat dissipation portion received in the fourth hole portion, a second gap is between the fourth heat dissipation portion and the fourth hole portion, and the adhesive is received in the second gap.

6. The optical projection module of claim 5, wherein the fourth heat dissipation portion comprises at least two fins parallel to each other, and the at least two fins protrude from the first holding portion.

7. The optical projection module of claim 3, wherein the optical member further comprises a collimation lens, a first diffraction optical element, and a second diffraction optical element, the collimation lens is between the first holding portion and the second holding portion and closes off an end of the receiving space opposite to the semiconductor substrate, the second holding portion has a seventh surface facing away from the sixth surface, the seventh surface of the second holding portion forms a recess, the first diffraction optical element and the second diffraction optical element are received in the recess, and the first diffraction optical element is between the collimation lens and the second diffraction optical element.

8. The optical projection module of claim 7, wherein the circuit board is a rigid-flexible circuit board which comprises a first rigid board portion, a second rigid board portion, and a flexible board portion connecting the first rigid board portion and the second rigid board portion, the semiconductor substrate is connected to the first rigid board portion, and the second rigid board portion has an electronic connecting component.

9. The optical projection module of claim 8, wherein a reinforcing plate is connected to the second surface of the circuit board, and the reinforcing plate is made of metal.

10. The optical projection module of claim 1, wherein the semiconductor substrate is made of ceramic.

11. The optical projection module of claim 1, wherein the light source is a vertical cavity surface emitting laser.

* * * * *